United States Patent
Kumpfmiller et al.

(10) Patent No.: US 6,423,472 B1
(45) Date of Patent: Jul. 23, 2002

(54) AQUEOUS DEVELOPABLE PHOTOSENSITIVE POLYURETHANE-METHACRYLATE

(75) Inventors: Ronald James Kumpfmiller; Martin Lewis Carter, both of Marietta, GA (US)

(73) Assignee: MacDermid Graphic Arts, Inc., Atlanta, GA (US)

( * ) Notice: Subject to any disclaimer, the term of this patent is extended or adjusted under 35 U.S.C. 154(b) by 0 days.

(21) Appl. No.: 09/535,353

(22) Filed: Mar. 24, 2000

Related U.S. Application Data

(63) Continuation of application No. 08/708,805, filed on Sep. 9, 1996, now Pat. No. 6,066,436.

(51) Int. Cl.⁷ .................. G03F 7/038; G03F 7/028
(52) U.S. Cl. .................. 430/284.1; 528/65; 522/96; 522/97
(58) Field of Search .................. 528/65; 430/284.1, 430/286.1, 287.1; 522/96, 97

(56) References Cited

U.S. PATENT DOCUMENTS

| | | | |
|---|---|---|---|
| 4,023,973 A | 5/1977 | Imaizumi et al. ......... 96/115 R |
| 4,587,201 A | 5/1986 | Morikawa et al. ........ 430/286.1 |
| 4,720,529 A | 1/1988 | Kimura et al. ............... 525/454 |
| 4,992,524 A | 2/1991 | Coady et al. ................. 528/49 |
| 5,185,234 A | 2/1993 | Nakatsukasa et al. .... 430/286.1 |
| 5,328,805 A | 7/1994 | Huynh-Tran et al. ....... 430/284 |
| 5,364,741 A | 11/1994 | Huynh-Tran et al. ....... 430/300 |
| 5,907,023 A | * 5/1999 | Chawla ....................... 528/49 |

OTHER PUBLICATIONS

PCT International Search Report dated Dec. 22, 1997, 1 page.
APS Search, USPATFULL File Search in Automated Patent Search System of the Patent and Trademark Office dated Oct. 6, 1997, excerpts from search on "Isonate".
Grant et al., *Grant & Hackh's Chemical Dictionary*, Fifth Ed. McGraw–Hill Book Company, New York, NY, 1987, pp. 31 and 63.

* cited by examiner

*Primary Examiner*—Cynthia Hamilton
(74) *Attorney, Agent, or Firm*—Carmody & Torrance LLP

(57) ABSTRACT

Butadiene-polyether prepolymers which can be used in photopolymer resins are prepared by reacting butadiene homopolymer with a stoichiometric excess of isocyanate and then reacting the product with polyether diol. Thereafter the composition is reacted with hydroxyalkyl(meth)acrylate and alkyldialkanolamine. Flexographic printing plates may be prepared using photopolymer resin comprising butadiene-polyether prepolymers.

26 Claims, No Drawings

AQUEOUS DEVELOPABLE PHOTOSENSITIVE POLYURETHANE-METHACRYLATE

This application is a continuation of Application Ser. No. 08/708,805 filed Sep. 9, 1996 now U.S. Pat. No. 6,066,436.

FIELD OF THE INVENTION

The invention relates to radiation curable polymers and formulations or compositions containing them, as well as photosensitive articles having solid surfaces or layers prepared from such polymers or formulations. The invention also relates to a process for making and using the polymers and making and using the photosensitive articles.

BACKGROUND OF THE INVENTION

Photocurable polymers and compositions are well known in the art for forming printing plates and other photosensitive or radiation sensitive articles. Generally, photocured printing plate comprise a support and a photosensitive surface or layer of photocurable composition. To prepare the printing plate the photosensitive surface is exposed to radiation in an imagewise fashion. The unexposed areas of the surface are then removed in developer baths.

In the past, removal of the unexposed surfaces has required the use of organic solvents which are environmentally unsafe, toxic and highly volatile. Thus, there has been a need to develop photocurable compositions which can be developed in non-organic solvent. In addition to possessing an aqueous photodevelopable photosensitive surface, a flexographic printing plate must be sufficiently flexible to wrap around a printing cylinder, while being strong enough to withstand the rigors of the typical printing process. Furthermore, the printing plate must be soft enough to facilitate ink transfer during printing and must be solvent resistant to inks typically used in printing. U.S. Pat. No. 5,328,805, Huynh-Tran, et al., "Aqueous Developable Photosensitive Polyurethane(METH)-acrylate" (1994) and U.S. Patent No. Huynh-Tran, et al., "Aqueous Developable Photosensitive Polyurethane(METH)-acrylate" (1994) teach photopolymer resins comprised of a urethane prepolymer prepared by reacting polyoxyalkylene diols with polyester diols, or a mixture thereof, with an excess of diisocyanate followed by chain extending the resulting prepolymer mixture with an alkyldialkanolamine, then reacting the chain-extended product with a hydroxyalkyl(meth)acrylate.

However, improved mechanical properties such as resistance to inks including oil, water and alcohol based inks is still desired. Incorporation of butadiene would yield more flexible, softer compositions. However, until now, urethane prepolymers have not incorporated butadiene because butadiene polymers are generally incompatible with typical urethanes resulting in a cloudy product which causes light scattering during the imagewise exposure step. Light scattering results in poor image quality in the resulting printing plate.

The printing plates of the present invention overcome this limitation, incorporating butadiene into urethane prepolymers and resulting in photopolymer products which are more resistant to inks, have improved resilience, improved cold-flow properties and lower surface tension.

SUMMARY OF THE INVENTION

A photopolymer resin composition comprising a polyether-polybutadiene prepolymer is provided by the present invention.

Methods of preparing photopolymer resins of the present invention are also provided comprising reacting to completion hydroxy-terminated butadiene homopolymer with isocyanate to produce isocyanate-terminated polybutadiene polyurethane; reacting isocyanate-terminated polybutadienepolyurethane with polyether diol to produce prepolymer; reacting prepolymer with 0 to 25 parts by weight of a hydroxyalkyl(meth)acrylate; reacting the products with 1–20 parts by weight of alkyldialkanolamine in the presence of solvent; and adding a photoinitiator, stablizers and UV absorber. Printing plates of the present invention may be prepared by casting photopolymers of present invention onto a plate substrate and drying the plate to remove the solvent.

OBJECTS OF THE INVENTION

It is an object of the invention to provide novel solid, water-dispersable polymer which can be cross-linked or cured by exposure to actinic radiation.

It is a further object of the invention to provide aqueous-developable flexographic relief printing plates and methods of making the same.

Another object of the invention is to provide a novel butadiene urethane prepolymer.

DETAILED DESCRIPTION

Photopolymer resins of the present invention comprise polyether-polybutadiene prepolymer and photoinitiator.

As general guidance in preparing compositions of the present invention, the milliequivalents of isocyanate added should be equal to or greater than the total milliequivalents of the remaining components, namely polybutadiene, polyether diol, alkyldialkanolamine, and hydroxyalkyl(meth)acrylate. However, it is generally preferred that the ratio of milliequivalents of isocyanate to non-isocyanate components be approximately equal. Alkyldialkanolamine generally is about 15–60% of the non-isocyanate components (based upon total milliequivalents) and preferably about 55–60%. Hydroxyalkyl(meth)acrylate makes up about 7–40% of the total non-isocyanate components, and preferably is about 8%.

To prepare compositions of the present invention hydroxy-terminated polybutadiene is reacted at about 25–80° C. with a stoichiometric excess of diisocyanate in the presence of a urethane forming catalyst to produce isocyanate terminated polybutadiene polyurethane. Thereafter, the isocyanate terminated polybutadiene polyurethane is mixed with polyether diol to form a prepolymer. The ratio of polybutadiene to polyether diol is from 1:1 to 1:5, and preferably 1:3. The prepolymer is reacted with hydroxyalkyl (meth)acrylate at a temperature of from about 60–80° C. Further reaction with an alkyldialkanolamine is performed in the presence of an organic solvent. Suitable solvents include methyl methyl ketone, methyl isobutyl ketone, toluene, and mixtures thereof. The solvents should have a boiling point in the range of 80–120° C. for easy casting of the films and evaporation of the solvent. Thereafter a curing agent is added.

Hydroxy-terminated Polybutadiene

Hydroxy-terminated polybutadiene has the formula

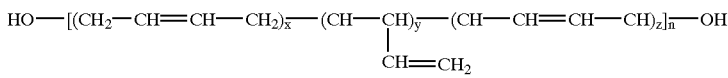

where x+y+z is 1 and n is from about 25 to about 50. It is preferred that x is 20%, y is 20% and z is 60% of the overall molecule. In preferred embodiments n is 50. Suitable polymers have a number average molecular weight in the range of about 1,000 to 10,000, preferably in the range of about 1,000 to 3,000. As used herein molecular weights are numbered average, $M_n$, as determined by Permeation Chromatography, using polystyrene standards. Hydroxylated polybutadiene is available from commercial sources such as Elf Atochem.

Polyether Diol

Polyether diols have the formula OH—(A—O—)$_b$H where A is a divalent radical of ethylene, propylene, isopropylene, butylene, isobutylyene; and b is such that the numbered average molecular weight of the group [A—O]$_b$, or of the polymer diol, is within the range of about 650 to about 7,000, preferably about 1,000–3,500. Ethylene oxide block polyether diol where the amount of ethylene oxide is 1–50 weight percent, preferably 10–30 weight percent and the overall molecular weight, 1,000 to about 7,000, preferably 1,000 to 4,000 are particularly preferred. In the instance where copolymers are used, the structure for A(O)$_b$ would be —(CH$_2$CH$_2$O)$_x$—(CH$_2$CH(CH$_3$)—O)$_y$—$_{(CH2}$CH$_2$O)$_z$— where x+z and y are such that the ethylene oxide moiety represent about 1–50, preferably 10–30 weight percent of the overall polyol molecular weight. Such copolymers include POLY G55-37 (MW 2952, containing about 30 weight percent of ethylene oxide), and POLY L 228-28(MW 4000, containing about 20 weight percent ethylene oxide), both available from Olin Corporation. The polyether diol reactants may be made by processes well known in the art by reacting an alkylene oxide or mixtures of alkylene oxides with a compound having at least one active hydrogen atom such as water, monohydroxylic alcohols such as ethanol and propanol; and dihydroxylic alcohols such as ethylene glycol and monoethyl ether of glycerine. The poly(oxyalkylene) products of such reactions will have linear oxyalkylene or oxyethylene higher oxyalkylene chains, and such chains will terminate with hydroxyl groups. Conventional potassium hydroxide catalysts or double metal cyanide catalysts can be used.

Diisocyanate

A wide variety of diisocyanates is available. These diisocyanates can be aliphatic, cycloaliphatic or aromatic, with the structure OCN—R$^1$NCO. The divalent radical R$^1$ contains in general 2 to 100 carbon atoms and may optionally carry non-interfering substituents such as ether groups, ester groups, urethane groups, amido groups, urea groups, aryl groups, aliphatic groups, cycloaliphatic groups, or halogen atoms. Modified diisocyanates are also usable. Examples of suitable diisocyanates include 4,4'-methylene diphenyl diisocyanate (MDI) and MDI prepolymers, 2,4-tolylene diisocyanate (toluene diisocyanate), 2,6-tolylene diisocyanate, mixtures of the two, dimers of 2,4-tolylene diisocyanate, p-xylene diisocyanate, m-xylene diisocyanate, 1,5-naphthalene diisocyanate, 3, 3'-dimethylbiphenyl-4, 4'-diisocyanate, hexamethylene diisocyanate, trimethylhexamethylene diisocyanate, lysine diisocyanate, lysine diisocyanate, isophorone diisocyanate, 4,4'-methylenebis(cyclohexylisocyanate), methyl-cyclohexane-2,4 (or 2,6)-diisocyanate, 1,3-isocyanatomethyl) cyclohexane, m-tetramethylxylene diisocyanate, p-tetramethylxylene diisocyanate, and mixtures thereof.

Catalyst

Conventional urethane forming catalysts may be used in the reactions with diisocyanates. These catalysts include, for example, organo-tin compounds such as dibutyl tin dilaurate and stannous octoate, organomercury compounds, tertiary amines, and mixtures of these materials.

Alkyldialkanolamine

Alkyldialkanolamines of the present invention have the structure HOR$^2$R$^3$R$^4$OH, where the numbered R$^2$ and R$^4$ are C1–C6 alkylene or R$^2$ is —(CH$_2$CH$_2$O)$_d$CH$_2$CH$_2$— provided R$^4$ is —(CH$_2$CH$_2$O)$_e$CH$_2$CH$_2$— where d and e are 0–9 and d+e is 3–15. R$^3$ is —N(R7)—, —NN—, or —N(Ph)— and R$^5$ is C1 to C6 alkyl group.

Within this group, methyldiethanolamine bis (hydroxylethyl)-piperazine,

and N,N'-bis(2-hydroxypropyl)aniline, HO—CH—(CH$_3$) CH$_2$—$_{N(Ph)}$— $_{CH2}$CH(CH$_3$)OH are preferred. (Ph=phenyl.)

Hydroxyalkyl(meth)acrylate

This material has the structure HO—R$^6$OC(—:O)—C (R$^7$)=CH$_2$, where R$^6$ is C1–C7 alkylene and R$^7$ is H or methyl. Within this structure polypropylene glycol monomethacrylate is preferred. Unless otherwise indicated, the term "(meth)acrylate" means either acrylate or methacrylate.

Formulations with the Invention Photopolymer

The simplest formulation is the invention photopolymer plus an effective amount of photo initiator. Such mixture can be solvent cast, as is, or the solvent removed and the mixture extruded to create a solid photopolymerizable layer on conventional backing material.

Diluent

For many commercial purposes it will be found preferable to formulate or extend the photopolymerizable prepolymer composition with about 1% to about 30% by weight of the prepolymer of a reactive (i.e., photoactive) monomer or oligomer, and most preferably in the range of 5 to about 15% by weight reactive monomer. Suitable reactive monomers or oligomers are mono, di or multiacrylate diluents of the formula:

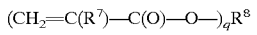

where R$^7$ is H or methyl, R$^8$ is an organic moiety having a valence of q, and q is an integer.

Such reactive (meth)acrylate diluents include, but are not limited to, trimethylolpropane triacrylate, hexanediol diacrylate, 1,3-butylene glycol diacrylate, diethylene glycol diacrylate, 1,6-hexanediol diacrylate, neopentyl glycol diacrylate, polyethylene glycol 200 diacrylate, tetraethylene glycol diacrylate triethylene glycol diacrylate, pentaerythritol, tetraacrylate, tripropylene glycol diacrylate, ethoxylated bisphenol-A diacrylate, propylene glycol mono/dimethacrylate, trimethylolpropane diacrylate, di-trimethylolpropane tetracrylate, triacrylate of tris (hydroxyethyl) isocyanurate, dipentaerythritol hydroxypentaacrylate, pentaerythritol triacrylate ethoxylated trimethylolpropane triacrylate, triethylene glycol dimethacrylate, ethylene glycol dimethacrylate, tetraethylene glycol dimethacrylate, polyethylene glycol-200 dimetharcrylate, 1,6-hexanediol dimethacrylate, neopentyl glycol dimethacrylate, polyethylene glycol-600 dimethacrylate, 1,3-butylene glycol dimethacrylate, ethoxylated bisphenol-A dimethacrylate, trimethylolpropane trimethacrylate, diethylene glycol dimethacrylate, 1,4-butanediol diacrylate, diethylene glycol dimethacrylate, pentaerythritol tetramethacrylate, glycerin dimethacrylate, trimethylolpropane dimethacrylate, pentaerythritol trimethacrylate, pentaerythritol diacrylate, urethanemethacrylate or acrylate oligomers and the like which can be added to the photopolymerizable composition to modify the cured product. Monoacrylates such as cyclohexyl acrylate, isobornyl acrylate, lauryl acrylate and tetrahydrofurfuryl acrylate and the corresponding methacrylates are also operable as reactive diluents, as well as methacrylate oligomers such as epoxy acrylates, urethane acrylates, and polyester or polyether acrylates.

Photoinitiators

The formulations comprising the novel materials of this invention require a photoinitiator. A large number are available and useful.

Photoinitiators for the photopolymerizable composition and formulations containing the same include the benzoin alkyl ethers, such as benzoin methyl ether, benzoin ethyl ether, benzoin isopropyl ether and benzoin isobutyl ether. Another class of photoiniators are the dialkoxyacetophenones exemplified by 2,2-dimethoxy-2-phenylacetophenone, i.e., Irgacure®651 (Ciba-Geigy) and 2,2-diethoxy-2-phenylacetophenone. Still another class of photoiniators are the aldehyde and ketone carbonyl compounds having at least one aromatic nucleus attached directly to the carboxyl group. These photoiniators include, but are not limited to, benzophenone, acetophenone, o-methoxybenzophenone, acetonaphthalene-quinone, methyl ethyl ketone, valerophenone, hexanophenone, alpha-phenyl-butyrophenone, p-morpholimopropiophenone, dibenzosuberone, 4-morpholinobenzophenone, 4'-morpholinodeoxybenzoin, p-diacetylbenzene, 4-aminobenzophenone, 4',-methoxyacetophenone, benzaldehyde, alpha-tetralone, 9-acetylphenanthrene, 2-acetylphenanthrene, 10-thioxanthenone, 3-acetylphenanthrene, 3-acetylindone, 9-fluorenone, 1-indanone, 1,3,5-tricetylbenzene, thioxanthen-9-one, xanthene-9-one, 7-H-benz[de]-anthracen-7-one, 1-napthaldehyde, 4,4'-bis(dimethylamino)-benzophenone, fluorene-9-one, 1'-acetonaphthone, 2'-acetonaphthone, 2,3-butedione, acetonaphthene, benz[a]anthracene 7.12 diene, etc. Phosphines such as triphenylphosphine and tri-o-tolylphosphine are also operable herein as photoinitiators. The photoinitiators or mixtures thereof are usually added in an amount ranging from 0.01 to 10% by weight of the total composition.

Other Additives

The compositions may also contain other additives which are known in the art for use in photocurable compositions, e.g., antioxidants, antiozonants and UV absorbers. To inhibit premature crosslinking during storage of the prepolymer containing compositions of this invention, thermal polymerization inhibitors and stabilizers are added. Such stabilizers are well known in the art and include, but are not limited to, hydroquinone monobenzyl ether, methyl hydroquinone, amylquinone, amyloxyhydroquinone, n-butylphenol, phenol, hydroquinone monopropyl ether, phenothiazine, phosphites, nitrobenzene and phenolic-thio compounds, and mixtures thereof. Such additives are used in an amount within the range of from about 0.01 to about 4% by weight of the prepolymer. These stabilizers are effective in preventing crosslinking of the prepolymer composition during preparation, processing and storage.

UV light absorbers, or UV light stabilizers, can be used to adjust the photospeed and, therefore, exposure latitude of the polymer material. Numerous materials will be apparent to those skilled in the art.

The most important light stabilizer classes are 2-hydroxybenzophenones, 2-hydroxyphenyl benzotriazoles, hindered amines and organic nickel compounds. In addition, salicylates, cinnamate derivatives, resorcinol monobenzoates, oxanilides, and p-hydroxy benzoates are used. These additives are used in the range of about 0.09 to about 4% by weight of the prepolymer.

Tinuvin® 1130, a substituted hydroxyphenyl benzotriazole, available from Ciba-Geigy Corp., has been found to work exceptionally well.

The compositions also may contain up to about 50% by weight of an inert particulate filler which is essentially transparent to actinic light. Such fillers include the organophilic silicas, bentonites, silica and powdered glass. Such fillers can impart desirable properties to the photocurable compositions and reliefs on printing plates containing those compositions.

The compositions may also contain dye and/or pigment coloring agents. The colorants present in the photopolymer composition must not interfere with the imagewise exposure and should not absorb actinic radiation in the region of the spectrum that the initiator, present in the composition is activatable.

The colorant may be chosen from among the numerous commercially available pigments and dyes. The coloring agent may be used in a solvent soluble form, or in the form of a dispersion. Where a particulate material is used, the particle size should be less than 5000 Angstroms. More preferably, the particles will be in the 200–3000 Angstrom range.

Although numerous pigments and dyes useful in the practice of the present invention will be apparent to those skilled in the art, a small number of such materials are listed here.

Suitable pigments include the Microlith® series available from Ciba-Geigy. Especially preferred are the A3R-K and 4G-K materials. Suitable dyes include for example, Baso Blue 645 (C.I.Solvent Blue 4), Baso Blue 688 (C.I. Solvent Blue 81), Luxol Fast Blue MBSN (C.I. Solvent Blue 38), Neopen Blue 808 (C.I. Solvent Blue 70), Orasol™ Blue 2GLN (C.I. solvent Blue 48), Savinyl® Blue GLS (C.I. Solvent Blue 44), Savinyl Blue RLS (C.I. Solvent Blue 45), Thermoplast Blue 684 (C.I. Solvent Violet 13) and Victoria Blue BO (C.I. Solvent Blue 7). Blue and violet are used in current applications but the color of the dye is not critical. Other colors could offer advantages, including for example, resistance to fading.

Formulations using the photopolymers of this invention include the following (in parts by weight):

(1) Photopolymer, about 50–100, preferably about 70–90;
(2) A mono-, di-, or multi(meth)acrylate diluent, which can be a monomer or oligomer, about 0–25, preferably about 5–15;

(3) Photoinitiator, about 0.1–10, preferably about 0.5–2.0;

(4) Organic solvent, 0 to about 200, preferably about 10–50; and (5) Stabilizers, UV absorbers, and colorants, 0.1–10, preferably about 1–4, total.

Preparation of Plate

The photocurable composition can then be shaped and formed as a solid layer of suitable thickness according to conventional solvent casting, i.e. dissolving the composition in a solvent, shaping the solution into a film or plate and removing the solvent. Conventional extrusion, calendaring or hot press techniques can also be used. Solid layers of the photosensitive composition in the form of a film can be adhered to supports such as those comprising polyester, nylon or polycarbonate. Other suitable supports include woven fabrics and mats, e.g. glass fiber fabrics or laminated materials made of, for example, glass fibers and plastics, and steel or aluminum coated plates. It is preferred that the supports are dimensionally stable and resistant to the washout solution.

It is also usually necessary to protect photosensitive surfaces from contamination by dirt and dust during storage before being exposed and washed. Such protection is accomplished by lamination or application of a flexible protective cover sheet to the side of the photocurable composition opposite that of the support. In addition, the photocurable compositions can sometimes be tacky and it is thus also desirable to apply a release film to the surface of the photosensitive layer before application of the cover sheet. The release film consists of a thin, flexible and water soluble polymeric film and allows for intimate contact between the surface of the photocurable composition opposite the support and an image-bearing negative applied to the surface.

Exposure and Development

Photosensitive articles comprising a support having a solid layer or surface comprising the photocurable composition, e.g., solid flexographic printing plates, can then be processed by well-known techniques for imagewise exposure to actinic light. Preferably, the light should have a wavelength of from about 230–450 microns. Exposure is through a negative placed between the light source and the photosensitive surface. Suitable sources of light include Type RS sunlamps, carbon arc lamps, xenon arc lamps, mercury vapor lamps, tungsten halide lamps and the like.

Exposure periods depend upon the intensity of the actinic light, thickness of the plate and the depth of the relief desired on the printing plate. Periods of from 1 to 20 minutes exposure are preferred.

After exposure and removal of the negative, the unexposed areas of the photosensitive surface can be developed (removed) in aqueous washout solutions as herein described. This feature is particularly advantageous as it avoids problems of disposing of washout solutions containing commonly used organic solvents, such as chlorinated solvents, alcohols or ketones. The washout solution should be slightly acidic and may contain a surfactant. Dilute vinegar or lactic acid solutions are preferred. Useful acidic surfactants include sodium alkynaphthalene-sulfonate, sodium alkylbenzene sulfonate, sodium alkylether sulfate, polyoxyalkylated alkylaryl phosphate ester sodium salt and the like. Overall additive concentrations are suitably 0.1–5%. Wash temperature can vary from 25–790° C., preferably at ambient temperature. Following washout, the plate may be postexposed for further hardening of the relief work.

EXAMPLES

The following examples are illustrative and are not meant to be limiting of the invention.

Raw materials used in the examples are described below:

| Item | Description |
| --- | --- |
| MDI | diphenylmethane diisocyanate from Aldrich Chemical Company |
| Poly G55-37 | ethylene oxide end-capped polyoxypropylene diol, hydroxyl number 37, MW = 3000, from Olin Corporation |
| Irgacure 651 | 2,2-dimethoxy-2-phenyl acetophenone from Ciba Geigy Corp. |
| PPG 3025 | Polypropylene oxide diol from Arco Chemical Co., MW = 1000 |
| PPGMMA | polypropylene glycol monomethacrylate, MW = 350–380 |
| MEK | methyl ethyl ketone |
| MDEA | methyl diethanol amine |
| BHT | 2,6-tert-butyl-4-methylatedphenol, MW 220 |
| T-12 | dibutyl tin dilaurate |
| Tinuvin ® 1130 | poly(oxy-1,2-ethanediyl),.alpha.-[3-[3] (2H-benzotriazol-2-yl)-5-(1,1-dimethylethyl)-4-hydroxyphenyl]-1-oxopropyl]-.omega.-[3-[3] (2H-benzotriazol-2-yl)-5-(1,1-dimethyiethyl)-4-hydroxyphenyl]-1-oxopropyl],.alpha.-[3-[3 (2-ethanediyl),.alpha.-[3-[3] (2H-benzotriazol-2-yl)-5-(1,1-dimethylethyl)-4-hydroxyphenyl]-1-oxopropyl]-.omega.-hydroxy-;polyethylene glycol |

Example A 162.95 g of poly G55-37, 108.8 g of PPG 3025, 100 g of Isonate 2181 and 0.02 g of T-12 were charged to a 2 liter resin kettle equipped with an overhead stirrer, a dry air purge, and a thermocouple. The reaction was at 60 to 65° C. for one hour until an isocyanate content of 0.88 milliequivalents per gram was reached. Then 86.55 g of Polybutadiene R45HT was added. The reaction mixture was kept at 65° C. for one hour until an isocyanate content of 0.6 milliequivalents per gram was reached. Then 189 g of toluene was added. The reaction mixture temperature was reduced to 50° C. 50 g of toluene was mixed with 12.9 g of MDEA and added to the reaction mixture via an addition funnel. The reaction proceeded at 50° C. for twenty minutes. 119.7 g of MEK were added. The reaction mixture was maintained at 50° C. for one hour until no change in the amount of isocyanate was seen by IR. 14.7 g of PPGMMA and 2.3 g of BHT were added. The reaction mixture was maintained at 50° C. for 3–16 hours until the IR spectrum showed the absence of an isocyanate peak at about 2260 cm–1. The final solution is milky in appearance.

Example B 100 g of Isonate, 89.02 g of Polybutadiene R45HT and 0.009 g of T-12 were charged to a 2 liter resin kettle equipped with an overhead stirrer, a dry air purge and a thermocouple. The reaction was at 60 to 65° C. for one hour until an isocyanate content of 2.18 milliequivalents per gram was reached. Then 153.3 g of poly-g 5537, 102.0 g of PPG 3025 were added. The reaction proceeded at 60° C. for one hour until an isocyanate content of 0.55 milliequivalents per gram was reached. Then 231.1 g of toluene and 115.5 g of MEK were added. The reaction mixture temperature was reduced to 40° C. Then 50 g of toluene were mixed with 11.46 g of MDEA and added to the reaction mixture via an addition funnel over a fifteen minute period. The reaction proceeded at 60° C. for one hour until no change in the amount of isocyanate was seen by IR. Then 33.3 g of toluene and 16.4 g of MEK were added to aid in mixing. Thereafter, 13.0 g of PPGMMA and 2.3 g of BHT were added. The reaction mixture was allowed to continue at 50° C. for 3–16 hours until the IR spectrum showed the absence of an isocyanate peak at about 2260 cm$^{-1}$. The final solution was slightly hazy in appearance.

To the above solution 4.7 g of Irgacure® 651 and 0.3 g of Tinuvin® 1130 were added and mixed well. The solution was cast on release coated polyester and dried, resulting in a solid translucent polymer. A 20 mil thick cured film of the above formulation exposed to actinic radiation for 6 minutes has the following properties: Shore A 55, resilience 45.

Example C 100 g of Isonate, 51.93 g of Polybutadiene R45HT and 0.008 g of T-12 were charged to a 2 liter resin kettle equipped with an overhead stirrer, a dry air purge and a thermocouple. The reaction was performed at 55° to 60° C. for one hour until an isocyanate content of 3.08 milliequivalents per gram was reached. Then 98.69 g of poly-G 5537 and 158.0 g of PPG 3025 were added. The reaction proceeded at 55° C. for one hour until an isocyanate content of 0.73 milliequivalents per gram was reached. Then 212.5 g of toluene and 106.3 g of MEK were added. The reaction mixture temperature was reduced to 40° C. Then 13.7 g of MDEA was added to the reaction mixture via an addition funnel over a fifteen minute period. The reaction mixture was maintained at 50° C. of one hour until no change in the amount of isocyanate was seen by IR. Then 15.56 g of PPGMMA and 2.1 g of BHT were added. The reaction mixture was allowed to continue at 50° C. for 3–16 hours until the IR spectrum showed the absence of an isocyanate peak at about 2260 cm$^{-1}$. The final solution was slightly hazy in appearance.

To the above solution 4.7 g of Irgacure® 651 and 0.3 g of Tinuvin® 1130 were added and mixed well. The solution was cast on release coated polyester and dried, resulting in a solid hazy polymer.

Example D 100 g of Isonate, 155.8 g of Polybutadiene R45HT and 0.009 g of T-12 were charged to a 2 liter resin kettle equipped with an overhead stirrer, a dry air purge and a thermocouple. The reaction was performed at 50° to 55° C. for one hour until an isocyanate content of 1.49 milliequivalents per gram was reached. Then 184.6 g of poly-G 5537 was added to the reaction mixture. The reaction mixture temperature was maintained at 50° C. for one hour until an isocyanate content of 0.60 milliequivalents per gram was reached. Then 229.2 g of toluene and 114.5 g of MEK were added. The reaction mixture temperature was reduced to 40° C. Then 16.8 g of MDEA was added to the reaction mixture. The reaction mixture was maintained at 50° C. for one hour until no change in the amount of isocyanate was seen by IR. Then 33.3 g of toluene and 16.4 g of MEK were added to aid with mixing. Thereafter, 2.6 g of isocyanate were added. The reaction mixture was allowed to continue at 50° C. for 3–16 hours until the IR spectrum showed the absence of an isocyanate peak at about 2260 cm$^{-1}$. The final solution was clear in appearance.

To the above solution 5.2 g of Irgacure®651 and 0.3 g of Tinuvin® 1130 were added and mixed well. The solution was cast on release coated polyester and dried, resulting in a solid transparent polymer. A polyester cover sheet with a hydroxyethylcellulose based release film was laminated onto the top of the dry photopolymer. The photopolymer plate was then imaged for 2 minutes and developed in a 2% lactic acid solution to yield a printing plate with a reproduction of the negative film. A 20 mil thick cured film of the above formulation exposed to actinic radiation for 6 minutes has the following properties: tensile strength @ 100% of elongation of 266 psi, tensile strength of 281 psi, modulus of 490 psi, elongation 107%, Shore A of 65, resilience of 45 and 24-hour ambient temperature swells in water, and isopropyl alcohol of 3% and 25.4%, respectively.

Example E 100 g of Isonate, 152.6 go of Polybutadiene R45HT and 0.01 g of T-12 were charged to a 2 liter resin kettle equipped with an overhead stirrer, a dry air purge and a thermocouple. The reaction was performed at 60° to 65° C. for one hour until an isocyanate content of 1.58 milliequivalents per gram was reached. The 198.9 g of poly-G 5537 and 231.4 g of toluene were added to the reaction mixture. The reaction mixture temperature was maintained at 60° C. for one hour until an isocyanate content of 0.61 milliequivalents per gram was reached. Then 55.4 g of PPGMMA were added. The reaction was allowed to continue at 60° C. for 2 hours until the IR spectrum showed no change in the size of the isocyanate peak at about 2260 cm–1. The reaction mixture temperature was reduced to 50° C. Then 115.7 g of MEK and 5.07 g of MDEA were added to the reaction mixture. The reaction mixture was maintained at 50° C. for 2 hours. Thereafter, 1.5 g of methanol was added to the reaction mixture, the reaction was continued with mixing at 50° C. for 3–16 hours until the IR spectrum showed the absence of isocyanate peak at about 2260 cm$^{-1}$. The final solution was clear in appearance.

To the above solution 5.2 g of Irgacure® 651 and 0.3 g of Tinuvin® 1130 were added and mixed well. The solution was cast on release coated polymer and dried, resulting in a solid transparent polymer. A polyester cover sheet with a hydroxyethylcellulose based release film was laminated onto the top of the dry photopolymer. A 20 mil thick cured film of the above formulation exposed to actinic radiation for 6 minutes had the following properties: Shore A of 55, resilience of 38 and 24-hour ambient temperature swells in water, and isopropyl alcohol of 6% and 30%, respectively.

Example F 100 g of Isonate, 152.8 g of Polybutadiene R45HT and 0.01 g of T-12 were charged to a 2 liter resin kettle equipped with an overhead stirrer, a dry air purge and a thermocouple. The reaction was performed at 60° to 65° C. for one hour until an isocyanate content of 1.59 milliequivalents per gram was reached. The 196.7 g of Poly-G 5537 and 26.5 g of toluene were added to the reaction mixture. The reaction was performed at 65° C. for 1.5 hour until an isocyanate content of 0.61 milliequivalents per gram was reached. 36.5 g of PPGMMA were added. The reaction was allowed to continue at 60° C. for 2 hours until the IR spectrum showed no change in the size of the isocyanate peak at about 2260 cm$^{-1}$. The reaction mixture temperature was reduced to 50 C. Then 113.2 g of MEK and 4.9 g of MDEA were added to the reaction mixture. The reaction mixture was maintained at 55° C. for 2 hours. Then 3.1 g of methanol was added to the reaction mixture and the reaction continued mixing at 55° C. for 3–16 hours until the IR spectrum showed the absence of an isocyanate peak at about 2260 cm$^{-1}$. The final solution was clear in appearance.

To the above solution 5.2 g of Irgacure® 651 and 0.3 g of Tinuvin® 1130 were added and mixed well. The solution was cast on release coated polyester and dried, resulting in a solid transparent polymer. A 20 mil thick cured film of the above formulation exposed to actinic radiation for 6 minutes had the following properties: Shore A of 55, resilience of 35, and 24 hour ambient temperature swells in water, and isopropyl alcohol of 6% and 30% respectively.

Example G 100 g of Isonate, 157.5 g of polybutadiene R45HT and 0.01 g of T-12 were charged to a 2 liter resin kettle equipped with an overhead stirrer, a dry air purge, and a thermocouple. The reaction proceeded at 60–65° C. for one hour until an isocyanate content of 1.61 meq/g was reached. Then 202.55 g of poly G55-37 and 230.8 was added to the reaction mixture. The reaction mixture temperature was maintained at 65° C. for 1.5 hours until an isocyanate content of 0.61 meq/g was reached. Then, 31.5 g of PPGMMA were added. The reaction mixture temperature was maintained at 60° C. for 2 hours until an isocyanate content of 0.37 meq/gram was reached. The reaction mixture temperature was reduced to 50° C. and 115.4 g of MEK and 5.1 g of MDEA were added to the reaction mixture. The reaction was allowed to continue at 55° C. for 2 hours. Then 3.7 g of methanol was added to the reaction mixture and the reaction was continued with mixing at 55° C. for 3–16 hours until the IR spectrum showed the absence of an isocyanate peak at about 2260 $cm^{-1}$. The final solution was clear in appearance.

To the above solution 4.9 g of Irgacure® 651 and 0.3 g of Tinuvin® 1130 were added and mixed well. The solution was cast on release coated polyester and dried, resulting in a solid transparent polymer. A 20 mil thick cured film of the above formulation exposed to actinic radiation for 6 minutes had the following properties: Shore A of 55, resilience of 32, and 24 hour ambient temperature swells in water, and isopropyl alcohol of 6% and 30% respectively.

Example H 100 g of Isonate, 52.8 g of polybutadiene R45HT and 0.01 g of T-12 were charged to a 2 liter resin kettle equipped with an overhead stirrer, a dry air purge, and a thermocouple. The reaction was performed at 60–65° C. for one hour until an isocyanate content of 3.19 meq/g was reached.

Then 203.8 g of Poly G55-37 was added to the reaction mixture. The reaction mixture temperature was maintained at 65° C. for one hour until an isocyanate content of 0.99 meq/g was reached. Then, 17.05 g of PPGMMA was added. The reaction mixture temperature was maintained at 65° C. for one hour until an isocyanate content of 0.83 meq/gram was reached. Then 401.0 g of toluene and 104.8 g of MEK were added. The reaction temperature was reduced to 50° C. and 18.5 g of MDEA were added to the reaction mixture. The reaction was allowed to continue at 50° C. for 3–16 hours until the IR spectrum showed the absence of an isocyanate peak at about 2260 $cm^{-1}$. The final solution was clear in appearance.

To the above solution 5.2 g of Irgacure® 651 and 0.3 g of Tinuvin® 1130 were added and mixed well. The solution was cast on release coated polyester and dried, resulting in a solid transparent polymer. A polyester cover sheet with a hydroxyethylcellulose base release film was laminated onto the top of the dry photopolymer. The photopolymer plate was then imaged for 2 minutes and developed in a 2% lactic acid solution to yield a printing plate with a good reproduction of the negative film. A 20 mil thick cured film of the above formulation exposed to actinic radiation for 12 minutes had the following properties: tensile strength @100% of elongation of 142 psi, tensile strength of 547 psi, modulus of 460 psi, elongation 300%, Shore A of 45, resilience of 38, melt index of 7.2 g/10 minutes and 24 hour ambient temperature swells in water, and isopropyl alcohol of 9% and 33% respectively.

Example I

To the solution of Example H was added 9.55 g of TMPMMA. The solution was cast on release coated polyester and dried resulting in a solid transparent polymer. A polyester cover sheet with a hydroxyethylcellulose based release film was laminated onto the top of the dry photopolymer. The photopolymer plate was then imaged for 2 minutes and developed in a 2% lactic acid solution to yield a printing plate with a good reproduction of the negative film. A 20 mil thick cured film of the above formulation exposed for 12 minutes has the following properties: tensile strength @100% of elongation of 159 psi, tensile strength of 574 psi, modulus of 425 psi, elongation 313%, Shore A of 55, resilience of 32, melt index of 7.1 g/10 minutes and 24 hour ambient temperature swells in water, and isopropyl alcohol of 8% and 32% respectively.

Example J 150 g of Isonate, 39.3 g of polybutadiene R-20LM and 0.04 g of T-12 were charged to a 2 liter resin kettle equipped with an overhead stirrer, a dry air purge, and a thermocouple. The reaction was performed at 60–65° C. for one hour until an isocyanate content of 3.88 meq/g was reached. Then 306.9 g of poly G55-37 was added to the reaction mixture. The reaction mixture temperature was maintained at 65° C. for one hour until an isocyanate content of 1.08 meq/g was reached. Then, 25.7 g of PPGMMA were added. The reaction mixture temperature was maintained at 65° C. for one hour until an isocyanate content of 0.89 meq/g was reached. Then 563.5 g of toluene and 147.2 g of MEK were added. The reaction mixture temperature was reduced to 50° C. Then 27.82 g of MDEA was added to the reaction mixture. The reaction was allowed to continue at 50° C. for 3–16 hours until the IR spectrum showed the absence of an isocyanate peak at about 2260 $cm^{-1}$. The final solution was clear in appearance.

To the above solution 5.5g of Irgacure® 651 and 0.8 g of Tinuvin® 1130 were added and mixed well. The solution was cast on release coated polyester and dried, resulting in a solid transparent polymer. A polyester cover sheet with a hydroxyethylcellulose base release film was laminated onto the top of the dry photopolymer. The photopolymer plate was then imaged for 4 minutes and developed in a 2% lactic acid solution to yield a printing plate with a good reproduction of the negative film. A 20 mil thick cured film of the above formulation exposed for 12 minutes had the following properties: tensile strength @100% of elongation of 134 psi, tensile strength of 296 psi, modulus of 289 psi, elongation 269%, Shore A of 50, resilience of 27, melt index of 5.1 g/10 minutes and 24 hour ambient temperature swells in water, and isopropyl alcohol of 9% and 58% respectively.

Example K 100 g TDI, 113.9 g of polybutadiene R45HT and 0.01 g of T-12 were charged to a 2 liter resin kettle equipped with an overhead stirrer, a dry air purge, and a thermocouple. The reaction was performed at 60–65° C. for one hour until an isocyanate content of 3.92 meq/g was reached. Then 435.5 g of poly G55-37 was added to the reaction mixture. The reaction mixture temperature was maintained at 65° C. for one hour until an isocyanate content of 1.17 meq/g was reached. Then, 34.34 g of PPGMMA were added. The reaction mixture temperature was maintained at 65° C. for one hour until an isocyanate content of 0.91 meq/g was reached. Then 734.7 g of toluene and 191.9 g of MEK were added. The reaction mixture temperature was reduced to 50° C. Then 37.3 g of MDEA was added to the reaction mixture. The reaction was allowed to continue at 50° C. for 3–16 hours until the IR spectrum showed the absence of an isocyanate peak at about 2260 cm$^{-1}$. The final solution was clear in appearance.

To the above solution 7.2g of Irgacure® 651 and 0.3 g of Tinuvin® 1130 were added and mixed well. The solution was cast on release coated polyester and dried, resulting in a solid transparent polymer. A polyester cover sheet with a hydroxyethylcellulose base release film was laminated onto the top of the dry photopolymer. The photopolymer plate was then imaged for 4 minutes and developed in a 2% lactic acid solution to yield a printing plate with a good reproduction of the negative film. A 20 mil thick cured film of the above formulation exposed for 12 minutes had the following properties: Shore A of 50, resilience of 45, melt index of 8.4 g/10 minutes and 24 hour ambient temperature swells in water, and isopropyl alcohol of 22% and 71% respectively.

Comparative Example L

A two liter resin kettle equipped with an air powered stirrer, a nitrogen purge and a thermowatch was charged with 100 parts polypropylene glycol diol having a number average molecular weight of about 3,000; and 100 parts of an ethylene oxide-propylene oxide block polyether diol having a numbered average molecular weight of about 2,000 and about 30% by weight of ethylene oxide terminal units. The two polyols were reacted with 19 parts of a mixture of 2,4-toluene diisocyanate 2,6 toluene diisocyanate (80/20 by weight) in the presence of 0.11 parts dibutyltin dilaurate at 75° C. for 2 hours.

The mixture was then reacted at 75° C. with 19 parts of PPGMMA for 1.5 hours.

The resulting isocyanate terminated polyurethane is reacted with 18.5 parts N-methyldiethanolamine (MW= 119.16) in the presence of 401 parts toluene and 104.8 parts methyl ethyl ketone at 50° C. until all of the isocyanate is consumed as determined by IR spectroscopy and the disappearance of the peak at 2600 cm$^{-1}$ to produce a polyurethane prepolymer.

To 100 parts of the prepolymer was added 0.1 parts of Irgacure 651 as curing agent, 0.014 parts of Tinuvin® 1130 (UV absorber) and 0.2 parts of trimethylolpropane trimethacrylate to produce a photosensitive resin composition.

Comparative Example M

A two liter resin kettle equipped with an air powered stirrer, a nitrogen purge and a thermowatch was charged with 100 parts polypropylene glycol diol having a number average molecular weight of about 3,000; and 100 parts of an ethylene oxide-propylene oxide block polyether diol having a numbered average molecular weight of about 2,000 and about 30% by weight of ethylene oxide terminal units. The two polyols were reacted with 19 parts of a mixture of 2,4-toluene diisocyanate/2,6 toluene diisocyanate (80/20 by weight) in the presence of 0.11 parts dibutyltin dilaurate at 75° C. for 2 hours.

The mixture was then reacted at 75° C. with 19 parts of PPGMMA for 1.5 hours.

The resulting isocyanate terminated polyurethane is reacted with 18.5 parts N-methyldiethanolamine (MW= 119.16) in the presence of 401 parts toluene and 104.8 parts methyl ethyl ketone at 50° C. until all of the isocyanate is consumed as determined by IR spectroscopy and the disappearance of the peak at 2600 cm$^{-1}$ to produce a polyurethane prepolymer. To 100 parts of the prepolymer was added 0.1 parts of Irgacure 651 as curing agent and 0.014 parts of Tinuvin® 1130 (UV absorber) to produce a photosensitive resin composition.

| EXAMPLE | A | B | C | D | E | F | G | H | I | J | K | L | M |
|---|---|---|---|---|---|---|---|---|---|---|---|---|---|
| Solution Appearance | milky | slight hazy | clear | clear | clear | clear | clear | clear | clear | clear | clear | clear | clear |
| ShoreA | | 55 | | 65 | 55 | 55 | 40 | 45 | 55 | 50 | 50 | 65 | 45 |
| Resilience (%) | | 45 | | 45 | 38 | 35 | 32 | 38 | 32 | 27 | 45 | 22 | 28 |
| Melt Flow (g/10 min) | | 5.5 | 0.3 | >30 | >30 | >30 | >30 | 7.2 | 7.1 | 5.1 | 8.4 | 7 | >14 |
| 100% Strength (psi) | | 195 | | 266 | | | | 142 | 159 | 134 | | 160 | 133 |
| Tensile Strength (psi) | | 268 | | 281 | | | | 547 | 574 | 296 | | 554 | 235 |
| Tensile Modulus (psi) | | 200 | | 490 | | | | 460 | 425 | 289 | | 250 | 614 |
| Elongation (%) | | 273 | | 107 | | | | 300 | 313 | 269 | | 473 | 537 |
| 24 Hour Swell Water (%) | | 3.1 | | 3 | 6 | 6 | 6 | 9 | 8 | 9 | 22 | 13 | 9 |
| IPA (%) | | | | 25.4 | 30 | 30 | 30 | 33 | 32 | 58 | 71 | 36 | 37 |
| 80% Water/20% IPA (%) | | 13.3 | | 5 | 17 | 19 | 21 | 21 | 18 | 19 | 43 | 33 | 22 |
| Crack Propagation | | yes | | yes | yes | no | no | no | no | no | no | no | no |
| Surface Tension (dyne/cm) | | | | | | | | 40 | 40 | 39 | | 70 | 70 |

What is claimed is:

1. A method of preparing a photopolymer resin comprising the steps of:
    (I) reacting to completion hydroxy-terminated butadiene with isocyanate to produce isocyanate-terminated polybutadiene polyurethane;
    (II) reacting isocyanate-terminated polybutadiene polyurethane with polyether diol to produce prepolymer;
    (III) reacting prepolymer with hydroxyalkyl(meth)acrylate; and
    (IV) reacting product of (III) with alkyldialkanolamine in the presence of solvent.

2. The method of claim 1 further comprising adding photoinitiator, stablizer and UV absorber.

3. The method of claim 1 wherein butadine has a number average molecular weight of about 3,000.

4. The method of claim 1 wherein the isocyanate is diphenylmethane diisocyanate.

5. The method of claim 1 wherein the polyether is ethylene block polyether diol having a number average molecular weight of about 3,000 and 30% by weight ethylene oxide terminal units.

6. The method of claim 1 wherein the hydroxyalky(meth)acrylate is polypropylene glycol monomethacrylate.

7. The method of claim 1 wherein the alkyldialkanolamine is N-methyldiethanolamine.

8. The method of claim 1 wherein the ratio of said polybutadiene to said polyether in said prepolymer is from 1:1 to 1:5.

9. The method of claim 8 wherein said polyether is the residue of a polyether diol of formula:

$$HO-(A-O-)_b-H$$

wherein A is ethylene, propylene, isopropylene, butylene, or isobutylene, and b is such that said polyether diol has a number average molecular weight of about 1000–3500.

10. The method of claim 9 wherein said polyether diol is ethylene oxide block polyether diol containing 10–30% by weight ethylene oxide units.

11. The method of claim 1 wherein said isocyanate-terminated polybutadiene is the residue of hydroxy-terminated polybutadiene having the formula:

$$HO-\{(CH_2-CH=CH-CH_2)_{\overline{x}}-(CH_2-CH)_{\overline{y}}-(CH_2-CH=CH-CH_2)_{\overline{z}}\}_{\overline{n}}-OH$$
$$|$$
$$CH=CH_2$$

wherein x+y+z is 1 and n is such that said hydroxy-terminated polybutadiene has a number average molecular weight of about 1000 to 10000.

12. A method of preparing a printing plate comprising the steps of:
(I) reacting to completion hydroxy-terminated butadiene with isocyanate to produce isocyanate-terminated polybutadiene polyurethane;
(II) reacting isocyanate-terminated polybutadiene polyurethane with polyether diol to produce prepolymer;
(III) reacting prepolymer with hydroxyalkyl(meth) acrylate;
(IV) reacting product of (III) with alkyldialkanolamine in the presence of solvent;
(V) adding photoinitiator, stablizer and UV absorber; and
(VI) casting the product of (V) onto a plate substrate; and drying the plate to remove the solvent.

13. The method of claim 12 wherein butadiene has a number average molecular weight of about 3,000.

14. The method of claim 12 wherein the isocyanate is a diphenylmethane diisocyanate.

15. The method of claim 12 wherein in the polyether is ethylene block polyether diol having a number average molecular weight of about 3,000 and 30% by weight ethylene oxide terminal units.

16. The method of claim 12 wherein the hydroxyalky (meth)acrylate is polypropylene glycol monomethacrylate.

17. The method of claim 12 wherein the alkyldialkanolamine is N-methyldiethanolamine.

18. The method of claim 12 wherein the ratio of said polybutadiene to said polyether in said prepolymer is from 1:1 to 1:5.

19. The method of claim 18 wherein said polyether is the residue of a polyether diol of formula:

$$HO-(A-O-)_b-H$$

wherein A is ethylene, propylene, isopropylene, butylene, or isobutylene, and b is such that said polyether diol has a number average molecular weight of about 1000–3500.

20. The method of claim 19 wherein said polyether diol is ethylene oxide block polyether diol containing 10–30% by weight ethylene oxide units.

21. The method of claim 12 wherein said isocyanate-terminated polybutadiene is the residue of hydroxy-terminated polybutadiene having the formula:

$$HO-\{(CH_2-CH=CH-CH_2)_{\overline{x}}-(CH_2-CH)_{\overline{y}}-(CH_2-CH=CH-CH_2)_{\overline{z}}\}_{\overline{n}}-OH$$
$$|$$
$$CH=CH_2$$

wherein x+y+z is 1 and n is such that said hydroxy-terminated polybutadiene has a number average molecular weight of about 1000 to 10000.

22. A printing plate comprising a substrate and a layer of UV-curable composition thereon, wherein the UV-curable composition comprises:
(a) 0.1–10 parts by weight of a photoinitiator;
(b) 50–100 parts by weight of a reaction product of a process comprising:
(i) reacting polyether-polybutadiene prepolymer with hydroxyalkyl(meth)acrylate to form a reaction mixture, wherein said polyether-polybutadiene prepolymer is isocyanate-terminated; and
(ii) reacting said reaction mixture further with alkyldialkylanolamine in the presence of a solvent; and
(c) 0–25 parts by weight of a reactive diluent.

23. The printing plate of claim 22 wherein said reactive diluent is an acrylate of the formula:

$$(CH_2=C(R^7)-C(O)-O-)_qR^8$$

wherein $R^7$ is H or methyl, $R^8$ is an organic moiety having a valence of q, and q is an integer.

24. A photocurable polymeric resin composition for use in making aqueous developable flexographic printing plates, said resin composition comprising:
(a) photoinitiator; and
(b) reaction product of a process comprising:
(i) reacting polyether-polybutadiene prepolymer with hydroxyalkyl(meth)acrylate to form a reaction mixture, wherein said polyether-polybutadiene prepolymer is isocyanate-terminated; and
(ii) reacting said reaction mixture further with alkyldialkanolamine in the presence of a solvent.

25. The photocurable polymeric resin composition of claim 24 wherein said composition further comprises a reactive diluent, said reactive diluent being an acrylate of the formula $(CH_2=C(R^7)-C(O)-O-)_q R^8$ wherein $R^7$ is H or methyl, $R^8$ is an organic moiety having a valence of q, wherein q is an integer.

26. The photocurable polymeric resin composition of claim 24 wherein the alkyldialkanolamine is N-methyldiethanolamine.

* * * * *